United States Patent [19]

Nakayama et al.

[11] Patent Number: 4,586,348
[45] Date of Patent: May 6, 1986

[54] REFRIGERATOR CABINET

[75] Inventors: Kiyoshi Nakayama, Ota; Takashi Kato, Kiryu; Tatsuo Sekiguchi, Meiwa; Mamoru Satoh, Oizumi; Koshiro Hayakawa, Tatebayashi, all of Japan

[73] Assignee: Sanyo Electric Co., Ltd., Japan

[21] Appl. No.: 573,962

[22] Filed: Jan. 26, 1984

[30] Foreign Application Priority Data

Jan. 28, 1983 [JP] Japan .................................. 58-13525
Jan. 28, 1983 [JP] Japan .................................. 58-13526
Feb. 16, 1983 [JP] Japan .................................. 58-25084

[51] Int. Cl.[4] ........................................... F25B 47/00
[52] U.S. Cl. ......................................... 62/277; 29/460;
52/656; 220/467; 312/214; 312/257 SM; 403/295; 403/402
[58] Field of Search .................. 62/277; 220/467, 430,
220/431, 73, 80; 312/214, 257 SM, 257 SK,
140; 29/150, 460; 403/295, 402; 52/656

[56] References Cited

U.S. PATENT DOCUMENTS

| | | | |
|---|---|---|---|
| 2,653,139 | 9/1953 | Sterling | 312/214 X |
| 3,157,306 | 11/1964 | Courson | 220/467 X |
| 3,440,308 | 4/1969 | Carbary et al. | 220/467 X |
| 3,797,194 | 3/1974 | Ekstein | 403/295 |
| 3,915,527 | 10/1975 | Besing | 220/467 X |
| 3,948,410 | 4/1976 | Anderson | 220/467 |
| 4,108,520 | 8/1978 | Litchfield | 312/140 X |
| 4,127,347 | 11/1978 | Pritchard | 403/295 X |
| 4,303,289 | 12/1981 | Hardy | 312/140 X |
| 4,470,718 | 9/1984 | Cwik | 403/402 |

Primary Examiner—William E. Tapolcai
Attorney, Agent, or Firm—Darby & Darby

[57] ABSTRACT

A refrigerator cabinet basically comprises the body of cabinet, an outer box, an inner box and a heat insulating layer filled in a space formed between the boxes, characterized in that the outer box comprises a top wall and both side walls formed by bending one steel sheet previously coated with paint and further flanges reinforced by a reinforcing member without calking and rivetting, the reinforcing member being engaged with and supported by the groove formed in the flange. Since the reinforcing member roughly L-shaped can be installed by inserting work thereof, it offers excellent workability. In addition, because the reinforcing member is arranged tightly along the inside surface of the groove, it will not interfere with the operation of inserting the high temperature cooling medium pipe of the refrigerating cycle into groove and offer excellent operability.

10 Claims, 12 Drawing Figures

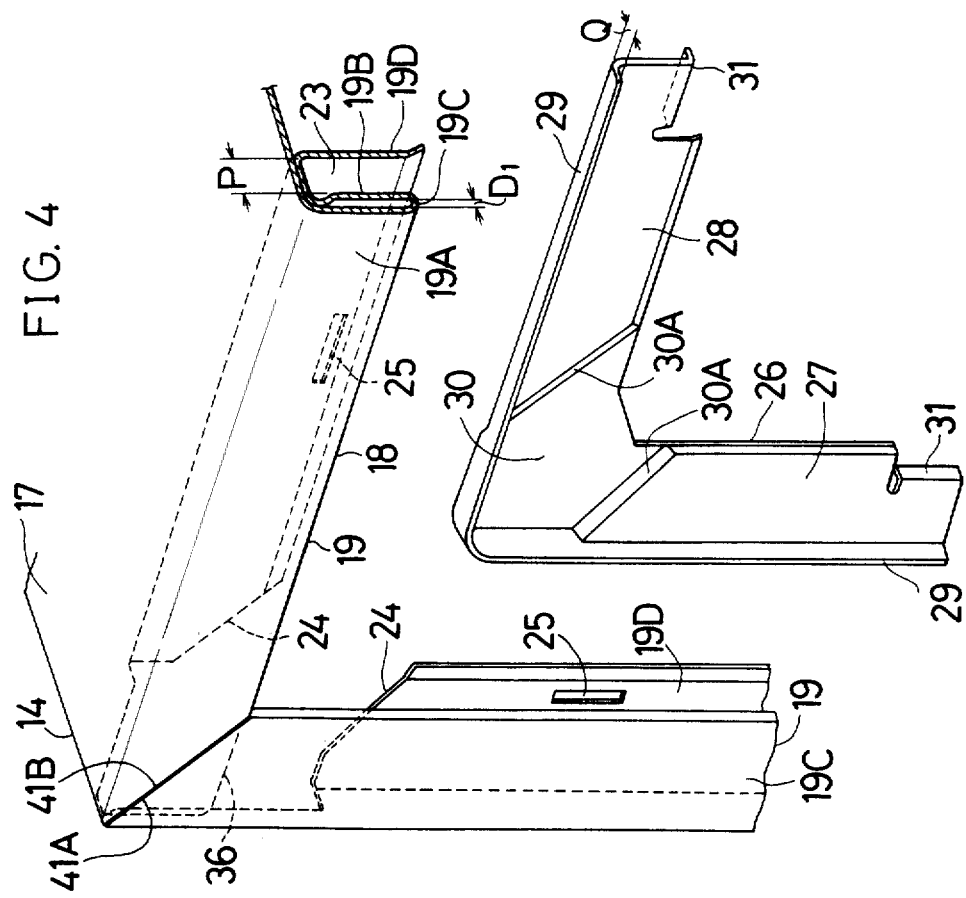
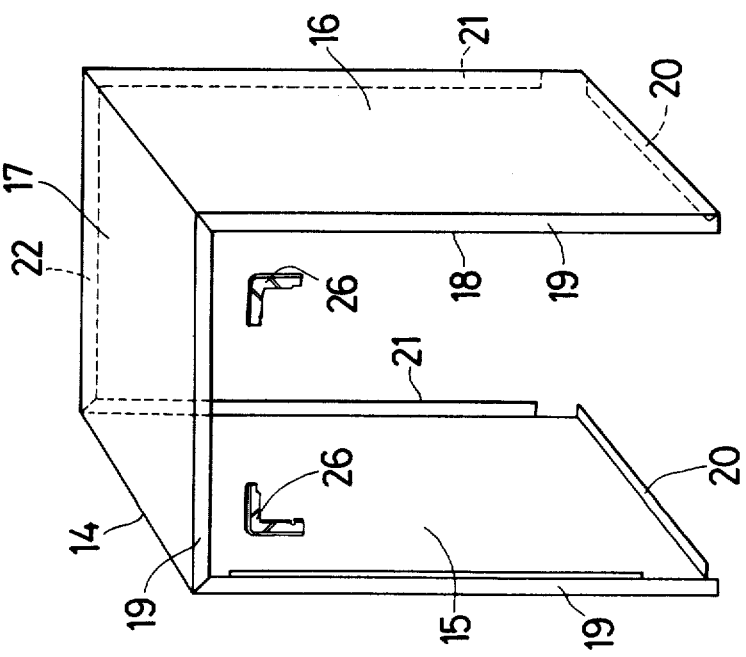

REFRIGERATOR CABINET

BACKGROUND OF THE INVENTION

A refrigerator normally comprises a cabinet (body) composed of an outer box, an inner box and a heat insulating layer filled in a space formed between the boxes to form a refrigerating chamber and a heat insulating door capable of opening and closing the entrance to the body. This invention relates to especially the former, and more particularly to the cabinet of a refrigerator comprising a top wall and both side walls formed by bending one steel sheet previously coated with paint.

The outer box of a refrigerator conventionally consists of a top wall (top plate) and both side walls (side plates) formed by bending one steel sheet in addition to a bottom plate, a back plate and a front plate welded thereto. Moreover, a groove facing inwardly for inserting the edge of an entrance of an inner box is formed in the front periphery of the top wall and both side walls. In other words, the groove facing inwardly comprises a fore flange consisting of a front flange formed by bending the top wall and both side walls and a rear flange folded back to make it contact the rear surface of the front flange tightly and continuously; and an inside flange bent in such a manner as to be continuous to the rear flange and to leave a predetermined space toward the backside of the rear flange.

However, on the front peripheries of the top wall and both side walls, the fore flange is made to overlap each other in both corner portions and normally the fore flange of the top wall is piled up on the rear surfaces of the side walls and fixed thereto by spot welding (for instance, the Japanese Utility Model 12755/1971).

In case the top wall and both the side walls are formed by bending one steel sheet previously coated with paint (this method is frequently employed because simple facilities can do the job and bad coating is seldom produced as compared with coating after the outer box has been three-dimensionally assembled), the bend of the bent portion of the fore flange must have a large radius because the paint film may be peeled off or produce a crack if the bending angle or bending radius is allowed to be small; this causes a gap in this portion to become large and is not preferred in view of its external appearance. Moreover, the above overlapping portions are combined together by caulking, gluing or rivetting because spot welding and the like causing the paint film to peel off cannot be adopted; the disadvantage includes an increase in the number of troubles caused by making holes for rivetting or gluing and scratches on the surface made by caulking.

One of the principal objects of the present invention which has been made in the light of the above described problems is to provide a refrigerator cabinet most suitable when the reinforcement of the front peripheries of the top wall and both side walls of its outer box is achievable without rivetting or caulking and when each of the walls of the outer box is formed by bending one steel sheet previously coated with painting.

SUMMARY OF THE INVENTION

The present invention provides a refrigerator cabinet having the body of the cabinet, an outer box, an inner box and a heat insulating layer filled in a space formed between the boxes, the improvement wherein the outer box comprises a top wall and both side walls formed by bending one steel sheet previously coated with paint, a front flange used to bend the front periphery of each wall inwardly at right angle, a turnover flange bent rearwardly to the backside of the front flange, and a rear bent flange leaving a predetermined space toward the backside of the turnover flange and used to form a groove facing and opening inwardly, and wherein a reinforcing member extending vertically and horizontally along the groove is engaged with the left and right corner portions of the groove in such a manner that the reinforcing member contacts the bent surface of the rear bent flange in the groove, and the front edge of the opening of the inner box is inserted in between the reinforcing member and the turnover flange.

BRIEF DESCRIPTION OF THE DRAWINGS

FIG. 3 is a front perspective view of the cabinet base.

FIG. 4 is an disassembled perspective view of the corner portion of the cabinet base and a reinforcing member.

DESCRIPTION OF THE PREFERRED EMBODIMENT

Figure 1:
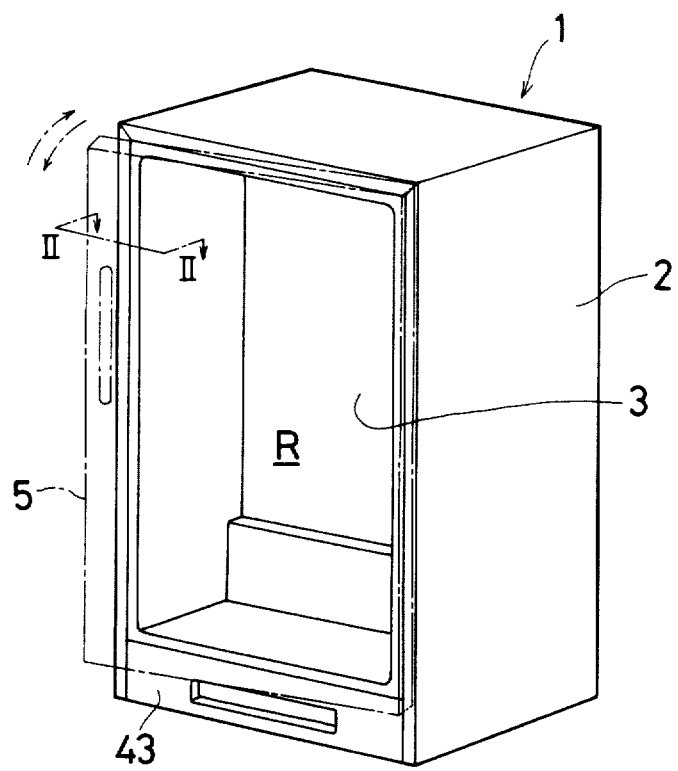
FIG. 1 is a front perspective view showing an exemplary embodiment of the refrigerator cabinet in accordance with the present invention.
Figure 2:
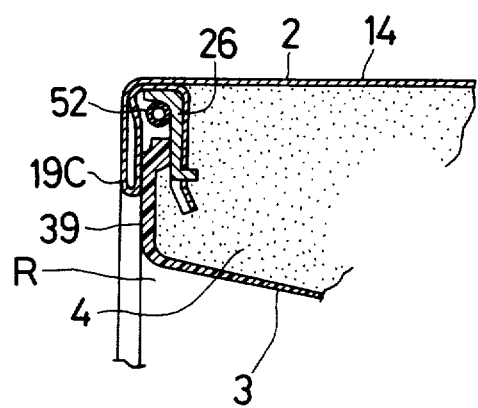
FIG. 2 is a cross-sectional view taken on the line II—II of FIG. 1.

Referring now to FIGS. 1-2, the cabinet 1 of a refrigerator comprises an outer box 2, an inner box 3 and a heat insulating layer 4 made of polyurethane foam material and filled in a space formed between both the boxes, whereby a refrigerating chamber R is substantially partitioned by the inner box 3. Numeral 5 indicated by an alternate long and short dash line is a door used to open and shut the entrance of the refrigerating chamber R airtightly and freely and properly supported by the cabinet 1 with upper and lower hinges (omitted).

Referring to FIGS. 3-12, the outer box 2 will be described in detail. Numeral 14 in the outer box 2 indicates a cabinet base forming part of the cabinet of a refrigerator, or the outer box. Its left side wall 15, a right side wall 16, a top wall 17 and a flange 19 in the peripheral portion of the front entrance 18 are formed by bending one steel sheet previously coated with paint. The cabinet base 14 is provided with horizontal flanges 20 bent inwardly at the lower edges of the left and right side walls, perpendicular flanges 21 bent inwardly at the rear edges thereof and a horizontal flange 22 bent downwardly at the end of the top wall 17.

The flange 19 comprises a pair of flanges, or a fore flange 19C forming a double flange with a front flange 19A formed by bending the left and right side walls 15, 16 and the top wall 17, and a bent rear flange 19B leaving a small predetermined space $D_1$ continuously toward the backside of the front flange 19A; and a back flange 19D located rearwardly and continuously with the rear flange 19B and used to form a groove 23 opening to the entrance 18. The back flange 19D is provided with cuts 24 in the left and right corner portions of the entrance 18, each being extended up to the open end of the groove 23 at an angle of roughly 45 degrees in the downwardly inclined direction toward the entrance 18. Moreover, the vertical and horizontal sides extending over the entrance 18 of the back flange 19D are each provided with catch holes 25 in a rectangular form. Numeral 26 is a reinforcing member formed by bending one steel sheet in a sectionally L shape and has the vertical and horizontal sides 27, 28 inserted into the groove 23 in each of the corner portions of the entrance 18. At the external end of each of the sides 27, 28, there is formed a flange 29 in addition to a step engaging portion 30 as an engaging portion formed in such a manner that it is recessed and engaged with a cut 24 in the corner portion and bent engaging pieces 31 as a catch formed by bending rearwardly at each tip of the vertical and horizontal sides 27, 28 and inserted in each of the holes 25.

Figure 5:
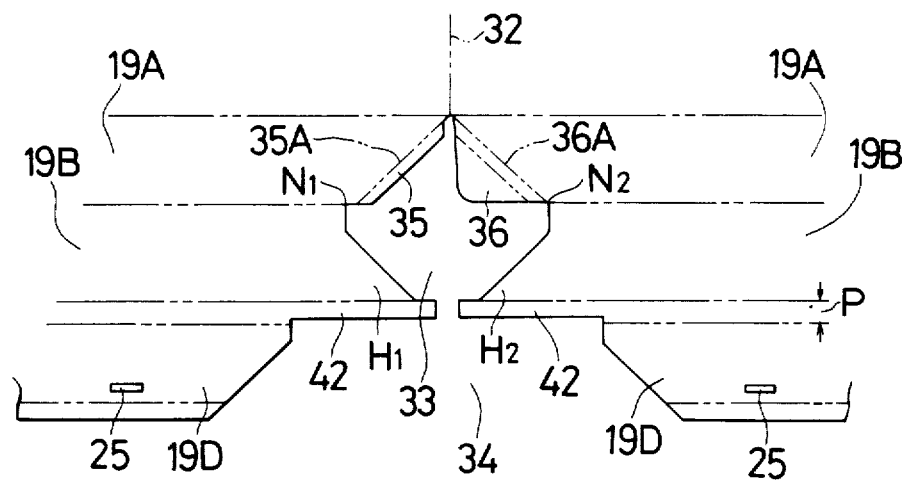
FIG. 5 is an exploded view of the corner portion of the cabinet base.

FIG. 5 is an exploded view of the left and right corner portions of the entrance 18 wherein a first tongue-like piece 35 is bent along a bending line 35A roughly connecting a first adjacent portion $N_1$ and a bent corner 32 and a second tongue-like piece 36 is provided with difference in level along a line 36A connecting a second adjacent portion $N_2$ and the bent corner 32. A roughly triangular shape enclosed by the adjacent portions $N_1$, $N_2$ and a point P corresponding to the bent corner 32 is only cut off the rear flange 19B and it is projected from both sides, so that triangular projected portions $H_1$, $H_2$ with a contacting portion 42 allowed to contact the left and right side walls 15, 16 and the rear side of the top wall 17 as the bottom are formed. In this case, the projected portions $H_1$, $H_2$ are formed so that they are located along the side plane of the first tongue-like piece 35 or a line 36A and not allowed to interfere with bending operation when the outer box 14 is bent.

Thus, if the outer box 14 is bent in the bent corner portion 32, the first tongue-like piece 36 overlaps the first tongue-like piece 35 and in the rear of the projected portion $H_1$ and both adjacent portions $N_1$, $N_2$ are placed close to each other. In this case, since the contacting portion 42 is extended up to the neighborhood of the bent corner 32 and the force generated when the outer box 14 is bent is applied to the sections of $H_1$, $H_2$ almost perpendicularly, the strength by far improves, thus preventing deformation thereof.

Figure 6:
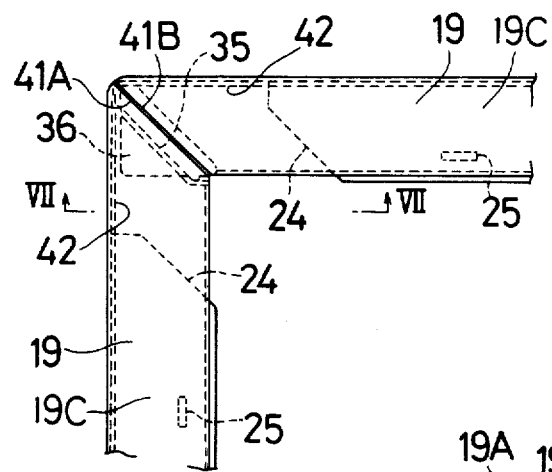
FIG. 6 is an elevational view of the corner portion of the cabinet.
Figure 7:
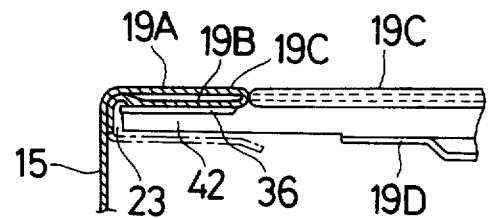
FIG. 7 is a sectional view taken on the line VII—VII of FIG. 6.
Figure 8:
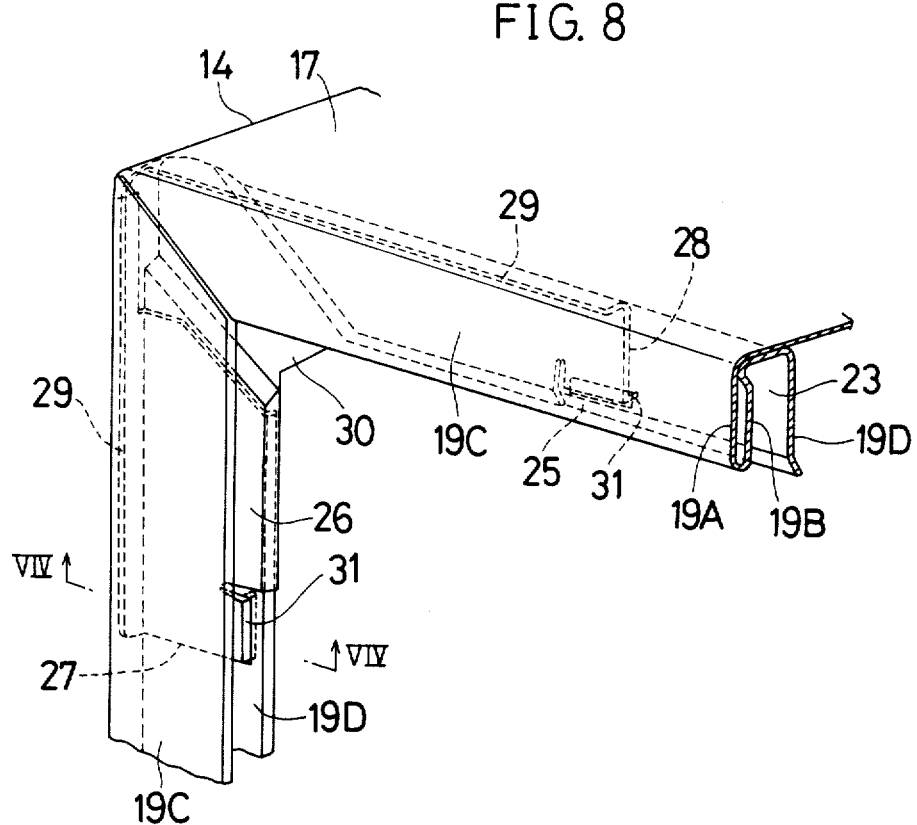
FIG. 8 is a front perspective view of the corner portion of the cabinet with the reinforcing member being inserted therein.
Figure 9:
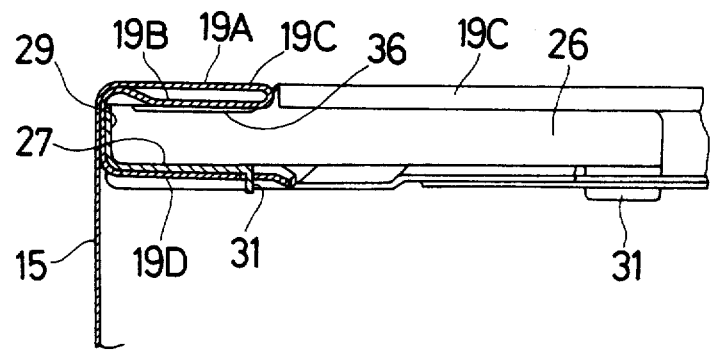
FIG. 9 is a sectional view taken on the line VIV—VIV of FIG. 8.

As shown in FIG. 6, both ends (41A)(41B) of the fore flange 19C are located close to each other. The reinforcing member 26 is inserted into the groove of the flange 19 thus formed. FIG. 8 illustrates the state in which insertion has been carried out. The reinforcing member 26 has been prepared in such a form as to go along the inner shape of the back flange 19D so that its vertical side 27 and horizontal side 28 and the flange 29 tightly contact the inside surface of the groove 23.

Moreover, the reinforcing member 26 is almost tightly engaged with the groove by the width Q of the flange 29 is made equal to the width P of the groove 23 in order to fully effect the function of the reinforcing member 26.

When the engagement is made, both the step portions 30A, 30B (see FIG. 4) are almost tightly engaged with the cuts 24 and each of the catches 31 is inserted into the catching hole 25, using a small amount of elasticity it is provided with. For this reason, the reinforcing member 26 can be engaged with the groove 23 in preferred condition. Since each of the flanges 19D is kept being connected to the engaging portion 30 by the engagement in the cut 24, the back flange 19D in the left or right corner portion of the entrance is in such a state that they are substantially continuous. By this is meant that, as shown later, when the outer box is combined with the inner box together with the foam heat insulator being filled therebetween, the insulator is effectively prevented from leaking out of the corner.

The contacting portion 42 continuously contacting the rear flange 19B up to the left and right side walls 15, 16 and the rear side of the top wall 17 is allowed to extend over the corner portion and act to resist the force applied when the steel sheet is bent. Moreover, as above described, the corner portions are constructed symmetrically in the horizontal direction and the left corner portion is described in detail in the drawing.

The coated steel sheet is preferably made of cold-rolled steel, and its thickness t is preferably in the range from 0.3 to 1.0 mm. The front flange and the turnover flange in each front flange section are preferably spaced apart a distance $D_1$ in the range from 3t to 5t as in FIG. 4. Of course, the radius of curvature of the flanges is half of the distance $D_1$. These limitations imposed on the bending are primarily attributable to considerations given to paint and can be relaxed by heating upon bending operation. Paint such as polyester resin paint, polyvinylchloride resin paint, acrylic resin paint or other resin paints is applied to the steel sheet so as to form a coating in the order of 0.01 –0.15 mm thickness by curtain flow coating, spray coating or roller coating. The coating operation can be effected before blanking the steel sheet as well as after the blanking, if the sheet is a single, substantially flat material as shown. If the coating is effected prior to the blanking, the steel sheet itself will be exposed as surfaces are formed by blanking. Accordingly, it is desired that appropriate anticorrosion treatment and decoration be made on the sheet.

The curtain flow coating can be effected with simpler facilities in a simpler manner resulting in a quite less rate of occurrence of substandard coating than electrostatic spray coating which is made on an outer box already assembled into a three-dimensional structure.

Subsequently, as the material of the reinforcing member, it is possible to use rigid synthetic resin, for instance, other than a steel sheet. To be concrete, resin of polycarbonate, polyacethal, polybutylen terephtalate series and the like or those reinforced by glass fiber are preferable examples. As the steel sheet, a cold-rolled steel sheet with thickness t being preferably 0.5–2 mm and most preferably 0.7–1.5 mm (1 mm in this embodiment) is preferred. Moreover, the length of the vertical and horizontal sides of the reinforcing member should be 90–200 mm and preferably 100–150 (108.5 mm in this embodiment). In the same way, the length of both pieces having the L section should be 20–40 mm (26.5 in the embodiment) and 3–8 mm (4 mm in the embodiment), whereas the height of the step engaging portion should be preferably 1-3 mm (2 mm in the embodiment).

Figure 10:
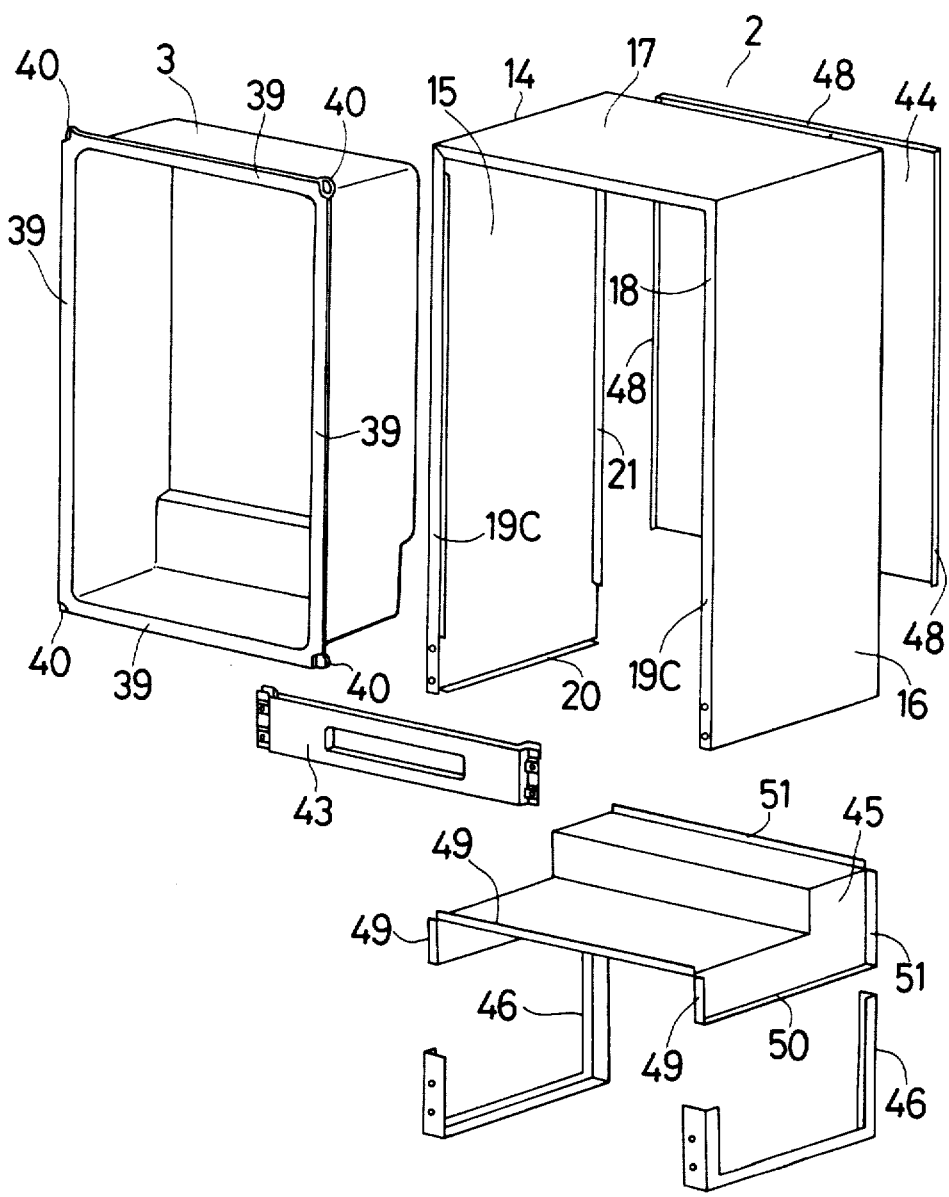
FIG. 10 is a disassembled perspective view of the box of the refrigerator.
Figure 11:
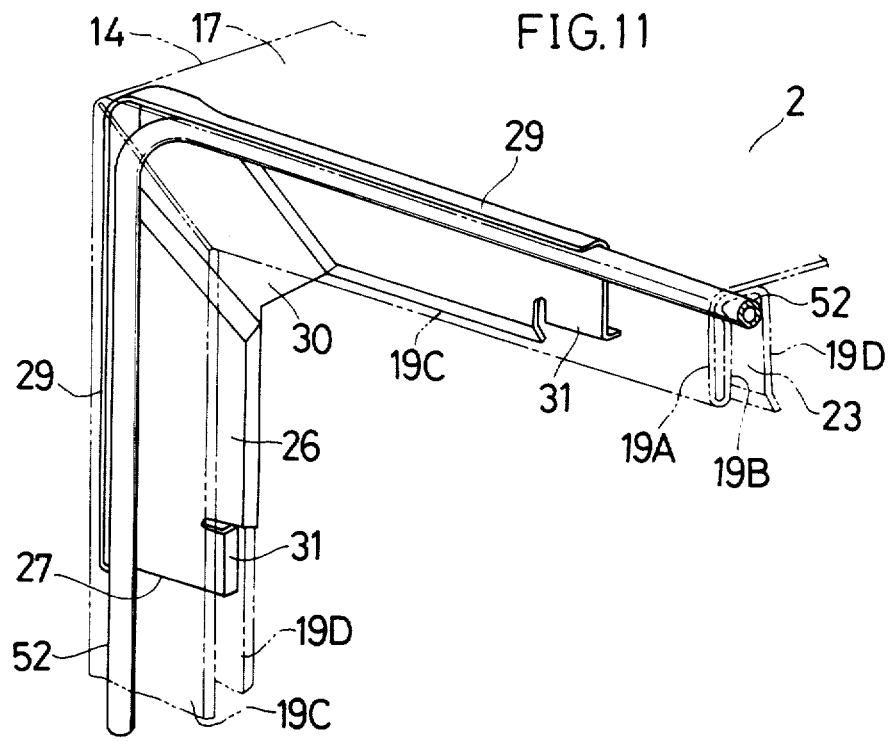
FIG. 11 is an elevational perspective view of the corner portion of the cabinet with the reinforcing member and a high temperature cooling medium pipe being inserted therein.

The cabinet, or the outer box 2 is completed after the corner portions of the cabinet base 14 are reinforced by the reinforcing member 26 by incorporating, as shown in FIG. 10, the front plate 43, rear plate 44, bottom plate 45 and reinforcing angle supports 46, 46. Both the ends of front plate 43 are fixed on the inner surface of the fore flange 19C with screws and the like at the lower end of the entrance of the cabinet base 14, whereas the rear plate 44 is fixed to the cabinet base 14 by inserting a flange 48 formed by bending it toward the upper, left and right sides and made to face forwardly into the grooves (not shown) made in the flanges 21, 22. The angle support 46 is prepared in a U shape using a relatively thick steel sheet and the supports 46 are located along the inner surfaces of the lower edges of the left and right side walls 15, 16 and then fixed on the inner surfaces of the flanges 20, 21 with screws and the like. The bottom plate 45 is formed into a sectionally U shape having upper, left and right surfaces in addition to the flange 49 at the edge of the front entrance and the flange 50 at the lower edge thereof, the plate being fixed to the angle supports 46 with screws by making the flange 49 contact the inner surface, the flanges 50, 51 the inner surface of the angle supports 46, respectively.

Numeral 52 indicates a cooling medium condenser of a cooling cycle arranged in the groove 23 of the cabinet base 14 of the cabinet 47 and forming part of a high temperature cooling medium piping, the condenser functioning to prevent dew from attaching to the front end of the cabinet base 14. Although the high temperature cooling medium pipe 52, for instance, 2.0 mm $\phi$ in an outside diameter and normally 1.5-3.0 mm $\phi$, is located deep in the groove 23 but in the corner constructed of the vertical and horizontal sides 27, 28 of the reinforcing layer 26 in the left right corner portions of the cabinet base 14. FIG. 14 illustrates this state. Since the reinforcing member 26 is tightly arranged on the inner surface of the groove, it will not interfere with the insertion of the high temperature cooling medium pipe 52 in the groove and thus operation.

Figure 12:
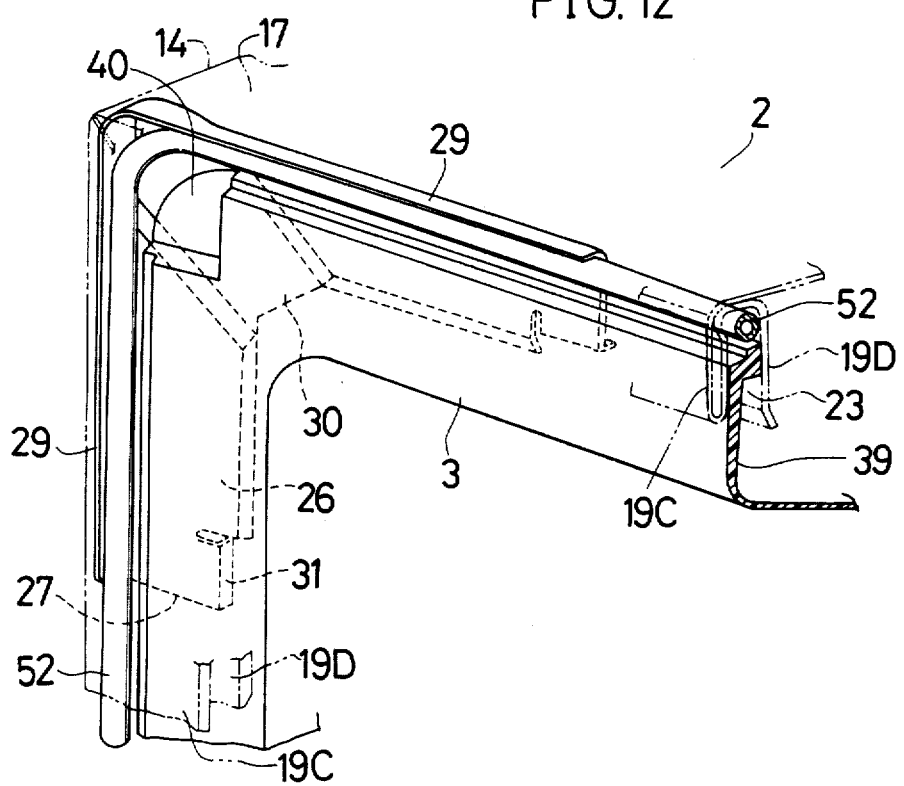
FIG. 12 is an elevational perspective view of the corner portion of the cabinet with the reinforcing member, the high temperature cooling medium pipe and an inner box being inserted therein.

After the cabinet 47 is completed and the high temperature cooling medium pipe 52 is installed, the inner box 3 is installed in the cabinet leaving a space therein. The refrigerator is thus constructed by injecting a foam polyurethane resin solution into the space and making it foaming according to the on-site foaming method to form the foam heat insulating layer. FIG. 12 illustrates this state. The inner box 3 shown in FIG. 2 forms the flange (for instance 3.0 mm thick) facing outwardly at the edge of the entrance and a step 40 (2 mm high, for instance) recessed rearwardly is formed in each of the four corners of the flange 39. The flange 39 is inserted between the fore flange 19C and the rear flange 19D in the groove 23 (about 8.5 mm spaced, for instance, and corresponds to P in FIG. 4 and normally 5-10 mm) when the inner box is incorporated. The flange 29 is tightly inserted in between the reinforcing member 26 and the fore flange 19C in each of the left and right corner portions of the cabinet base 14. Moreover, since the step 40 tightly contacts the engaging portion 30, the heat insulating layer 4 will not leak out of the groove 23 outwardly when its solution foams. In this case, the side surface of the step 40 is prepared in the form arc and accordingly the high temperature cooling medium pipe 52 is prevented from interfering the operation of assembling the inner box 3 by touching the step 40.

Although a small space is partially present between the flange 39 and the rear flange 19D in the groove 23 where the reinforcing member 26 is absent depending on the thickness of the reinforcing member 26, the gap is so small that the heat insulating solution is not allowed to leak outwardly because it is solidified when entering the gap. If it is feared that the solution may leak out of the gap, it can be prevented with certainty by dropping the inner box flange 39 rearwardly where the reinforcing member 26 is absent and making the inner box flange 39 tightly contact the back flange 19D so as to nullify the gap.

As above described, in the cabinet (1) of refrigerator formed by bending a steel sheet coated with paint to prepare the left and right side walls, the top wall and further the flange facing forwardly in the end portion thereof, the flange can be fully reinforced without conventional caulking and rivetting by the reinforcing member engaged with the groove formed in the flange. Since the reinforcing member is engaged with and supported by the groove, the fixation of the reinforcing member can be completed by the inserting work and this offers excellent workability. Moreover, because the reinforcing member is used to bury the cut make in the rear wall of the groove so as to prevent the heat insulating layer from leaking as a leakage preventing material, the heat insulating is effectively prevented from leaking outwardly. In addition, as the reinforcing member is arranged tightly along the inside of the groove, it will not interfere with the operating of inserting the high temperature cooling medium pipe of the refrigerating cycle into the groove and offer excellent workability.

What is claimed is:

1. A refrigerator cabinet having an outer box, an inner box, said inner box having an outwardly extending flange extending around its front opening for mounting said inner box in said outer box, and a heat insulating layer filled in a space formed between the boxes, wherein the outer box comprises a top wall and side walls formed by bending one steel sheet previously coated with paint, a front flange used to bend the front periphery of each wall inwardly at substantially right angles, a turnover flange bent rearwardly to the backside of the front flange, and a rear bent flange leaving a predetermined space toward the backside of the turnover flange, forming a groove facing and opening inwardly around the entrance of said outer box, said groove having left and right corner portions, wherein a reinforcing member extending vertically and horizontally along said groove is engaged with said left and right corner portions of the groove in such a manner that the reinforcing member contacts the rear bent flange in the groove and leaves another predetermined space between said reinforcing member and said turnover flange, and said outwardly extending flange at the front edge of the opening of the inner box is tightly inserted in between the reinforcing member and the turnover flange.

2. A refrigerator cabinet having an outer box, an inner box, said inner box having a front edge extending around its opening for mounting said inner box in said outer box, and a heat insulating layer filled in a space formed between the boxes, wherein said outer box comprises a top wall and side walls formed by bending one steel sheet previously coated with paint, a front flange used to bend the front periphery of each wall inwardly at substantially right angles, a turnover flange bent rearwardly to the backside of said front flange, and a rear bent flange leaving a predetermined space toward the backside of the turnover flange and used to form a groove facing and opening inwardly, said groove having left and right corner portions, wherein a reinforcing member extending vertically and horizontally along said groove is engaged with said left and right corner portions of said groove in such a manner that said reinforcing member contacts the rear bent flange in the groove, and said front edge of the opening of the inner box is inserted in between the reinforcing member and the turnover flange, and wherein said rear bent flange is cut at the left and right corner portions, the end of said cut being formed so that it tilts inwardly, said reinforcing member having an engaging portion for gripping the cut end of the rear bent flange.

3. In a refrigerator cabinet as claimed in claim 2, wherein the engaging portion of the reinforcing member is an engaging step portion.

4. In a refrigerator cabinet as claimed in claim 3, wherein the section of the portion of the reinforcing member extending vertically and horizontally is roughly L-shaped along the rear bent flange and the L-shaped section is formed by bending one steel sheet, and the engaging step portion comprises step portions of the steel sheet.

5. In a refrigerator cabinet as claimed in claim 4, wherein the edge of the opening of the inner box inserted in between the reinforcing member and the turnover flange is provided with a step portion for gripping a recess portion formed on the rear surface of the steel sheet by the engaging step portion of the reinforcing member.

6. In a refrigerator cabinet as claimed in claim 2, wherein the rear bent flange is provided with holes in the rear flange portions of the left and right corner portions and the reinforcing member is equipped with catches for insertion in the holes.

7. In a refrigerator cabinet as claimed in claim 4, wherein the rear bent flange is provided with holes in the rear flange portions of the left and right corner portions and the reinforcing member is equipped with bent pieces for insertion into the holes.

8. In a refrigerator cabinet as claimed in claim 5, wherein the insulating layer is a polyurethane foam body uniformly formed by injecting undiluted foam solution into a space formed between the outer and inner boxes.

9. In a refrigerator cabinet as claimed in claim 4, wherein the coated steel sheet is made of a cold-rolled steel sheet having a thickness of 0.3–1.0 mm and the reinforcing member is made of a cold-rolled steel sheet having a thickness of 0.5–2.0 mm.

10. In a refrigerator cabinet as claimed in claim 4, wherein the reinforcing member is provided with a high temperature cooling medium forming part of the refrigerating cycle in the cross-sectionally L-shaped corner portions before being inserted in the groove facing inwardly.

* * * * *